US008583957B2

(12) United States Patent
Chandhoke et al.

(10) Patent No.: US 8,583,957 B2
(45) Date of Patent: Nov. 12, 2013

(54) CLOCK DISTRIBUTION IN A DISTRIBUTED SYSTEM WITH MULTIPLE CLOCK DOMAINS OVER A SWITCHED FABRIC

(75) Inventors: Sundeep Chandhoke, Austin, TX (US); Lee E. Mohrmann, Round Rock, TX (US); Adam C. Ullrich, Austin, TX (US); Rodney D. Greenstreet, Leander, TX (US)

(73) Assignee: National Instruments Corporation, Austin, TX (US)

( * ) Notice: Subject to any disclaimer, the term of this patent is extended or adjusted under 35 U.S.C. 154(b) by 657 days.

(21) Appl. No.: 12/844,248

(22) Filed: Jul. 27, 2010

(65) Prior Publication Data

US 2012/0030495 A1 Feb. 2, 2012

(51) Int. Cl.
*G06F 1/12* (2006.01)

(52) U.S. Cl.
USPC ........................................... 713/401; 713/502

(58) Field of Classification Search
USPC ...................... 713/375, 400, 502, 503, 600
See application file for complete search history.

(56) References Cited

U.S. PATENT DOCUMENTS

| 5,535,193 | A | * | 7/1996 | Zhang et al. | 370/253 |
| 5,717,704 | A | * | 2/1998 | Rosenfeld | 714/736 |
| 6,259,677 | B1 | * | 7/2001 | Jain | 370/252 |
| 7,263,149 | B2 | | 8/2007 | Ware et al. | |
| 7,573,914 | B2 | * | 8/2009 | Ilnicki et al. | 370/519 |
| 7,590,151 | B2 | * | 9/2009 | Middleton et al. | 370/516 |
| 2002/0116468 | A1 | * | 8/2002 | Ishikawa | 709/208 |
| 2002/0174311 | A1 | | 11/2002 | Ware et al. | |
| 2004/0049706 | A1 | * | 3/2004 | Strong | 713/400 |
| 2004/0064750 | A1 | * | 4/2004 | Conway | 713/401 |
| 2004/0073718 | A1 | * | 4/2004 | Johannessen et al. | 709/400 |
| 2006/0056559 | A1 | * | 3/2006 | Pleasant et al. | 375/356 |
| 2006/0129776 | A1 | | 6/2006 | Ware et al. | |
| 2006/0288249 | A1 | * | 12/2006 | Knepper et al. | 713/500 |
| 2009/0135854 | A1 | * | 5/2009 | Bettin et al. | 370/503 |
| 2011/0011313 | A1 | * | 1/2011 | Yang | 108/158.12 |

OTHER PUBLICATIONS

"Non-Transparent Bridging Simplified—Multi-Host System and Intelligent I/O Design with PCI Express"; PLX Technology; 2004; 4 pages.
Jack Regula; "Using Non-Transparent Bridging in PCI Express Systems"; PLX Technology, Inc.; Jun. 1, 2004; 31 pages.
"Ethernet Time Synchronization White Paper—Providing Native Timing Within the Network"; Broadcom Corporation; Oct. 2008; 36 pages.

* cited by examiner

*Primary Examiner* — Khanh Dang
(74) *Attorney, Agent, or Firm* — Meyertons Hood Kivlin Kowert & Goetzel, P.C.; Jeffrey C. Hood; Mark S. Williams

(57) ABSTRACT

System and method for synchronizing devices. A device reads a first counter coupled to and associated with a master clock and a second counter coupled to and associated with the device, where the device is one of one or more devices coupled to the master clock and each other via a switched fabric, where each device includes a respective clock, and is coupled to and associated with a respective second counter. Each of the first counter and the second counters is accessible by each of the one or more devices. The device determines a difference between the device's associated second counter and the first counter, and determines and stores a time reference for the device relative to the master clock based on the determined difference, where the time reference is useable to timestamp events or synchronize future events.

16 Claims, 11 Drawing Sheets

CLOCK DISTRIBUTION IN A DISTRIBUTED SYSTEM WITH MULTIPLE CLOCK DOMAINS OVER A SWITCHED FABRIC

FIELD OF THE INVENTION

The present invention relates to the field of networked devices, and more particularly to clock distribution in a distributed system with multiple clock domains over a switched fabric.

DESCRIPTION OF THE RELATED ART

PCI (Peripheral Component Interconnect) was originally designed as an interconnect for personal computers (PCs). Because of the architecture of PCs, only one processor can control the system. If a second processor is added, the system operation would fail as both processors attempt to service the system requests. PCI-Express (PCIe) was originally conceived as a distributed-clock architecture. A common system clock is distributed to all PCI-Express devices in the system to allow all components in the systems to communicate coherently at gigahertz bit rates while taking advantage of spread-spectrum clocking technology to reduce the peak radiated emissions profile to meet the requirements of various regulatory bodies.

Distributed computing is gaining in popularity, and some switched fabric specifications, e.g., PCI-Express specifications, allow cabled interconnects, and so there is a need to allow multiple processors to connect to each other over the fabric, e.g., using PCI-Express. Such implementations require the use of clock domain crossing to allow portions of the system that use the fabric, e.g., PCI-Express, to operate using independent clocks. One example of this would be two independent systems linked via a Non-Transparent Bridge (NTB). In this configuration, the two systems do not share a single clock, but need to transfer data over the fabric, e.g., over a PCI-Express interface, and allow spread-spectrum clocking.

A NTB switch functions as a gateway between processors. It isolates intelligent (processor based) subsystems from each other by masquerading as endpoints to discovery software and translating the addresses of transactions that cross the bridge. It hides the devices connected to each intelligent system from each other.

FIG. 1 illustrates an exemplary distributed system 100 with multiple clock domains, according to the prior art. As shown, multiple devices, each with a respective processor and I/O ports, are coupled to one another via a switched fabric 108, in this particular case, a PCIe based switched fabric, represented here by a PCIe switch with transparent bridge 110 and one or more non-transparent bridges 120. As may be seen, the devices include a host device 102 and two peripheral controllers 104 and 106, where each device includes a respective logical clock, referred to herein as simply a "clock", which may (or may not) be associated with a respective physical clock. Each of the devices also includes a respective transparent bridge (112, 114, and 116, respectively). FIG. 1 also illustrates disciplining of the peripheral controller (logical) clocks to the clock of the host device, here illustrated by dashed lines from the host device clock to each of the slave device clocks.

One problem with some switched fabrics, e.g., those utilizing an NTB switch, relates to synchronizing the clocks of devices or processors connected to it. Since each side of an NTB is logically isolated from the other, data and status exchange between the processor domains cross clock boundaries. In prior art approaches to synchronizing 10 connected to each processor or to synchronizing software logic executing on each processor with each other, additional dedicated connections need to be made between the processors and/or IO, which may increase the complexity and expense of the system.

Thus, improved systems and methods for clock distribution in a distributed system with multiple clock domains over a switched fabric are desired.

SUMMARY OF THE INVENTION

Various embodiments of a system and method for clock distribution in a distributed system with multiple clock domains over a switched fabric are presented below.

The distributed system may include a master clock (e.g., a physical clock, clock reference, or clock signal), a first counter coupled to and associated with the master clock (e.g., a master counter), and one or more devices coupled to the master clock and each other via a switched fabric, where each device includes a respective (physical and/or logical) clock and time control loop, and one or more second counters. Each second counter may be coupled to and associated with a respective one of the one or more devices, and each second counter may be accessible by each of the one or more devices.

A device may read a first counter coupled to and associated with a master clock, as well as a second counter coupled to and associated with the device. For example, the device may be one of one or more devices coupled to the master clock and each other via a switched fabric, e.g., a PCIe switched fabric. The coupled devices and switched fabric may thus form a distributed system. In one embodiment, the one or more devices may be slave devices. In one embodiment, each device may include a respective clock and a second counter. Thus, each second counter may be coupled to and associated with a respective one of the one or more devices. Moreover, each of the first counter and the second counters may be accessible by each of the one or more devices. In other words, any of the one or more devices may read any of the counters.

A difference between the device's associated second counter and the first counter may be determined, e.g., by the device. Thus, for example, if the value of the first counter is V1, and the value of the device's associated second counter is V2, the device may compute (V1−V2), or, alternatively, (V2−V1), depending on sign convention. This difference may thus indicate the error or difference between the master clock and that of the device.

A time reference for the device relative to the master clock may be determined and stored based on the determined difference. The time reference may then be useable to time stamp events or synchronize future events. In other words, the time reference may be used by the device to operate in synchrony with the master clock, or to time stamp data in accordance with the master clock, or used by some other device, e.g., a master device, to perform some function, e.g., a communication or control function. More generally, the time reference allows the device(s) to operate or to be operated in a manner where timing differences between the device's clock and the master clock are compensated for.

Thus, embodiments of the present invention may operate to compensate for differences between devices' local clocks and a master clock in a switched fabric-based distributed system.

BRIEF DESCRIPTION OF THE DRAWINGS

A better understanding of the present invention can be obtained when the following detailed description of the preferred embodiment is considered in conjunction with the following drawings, in which.

Figure 1:
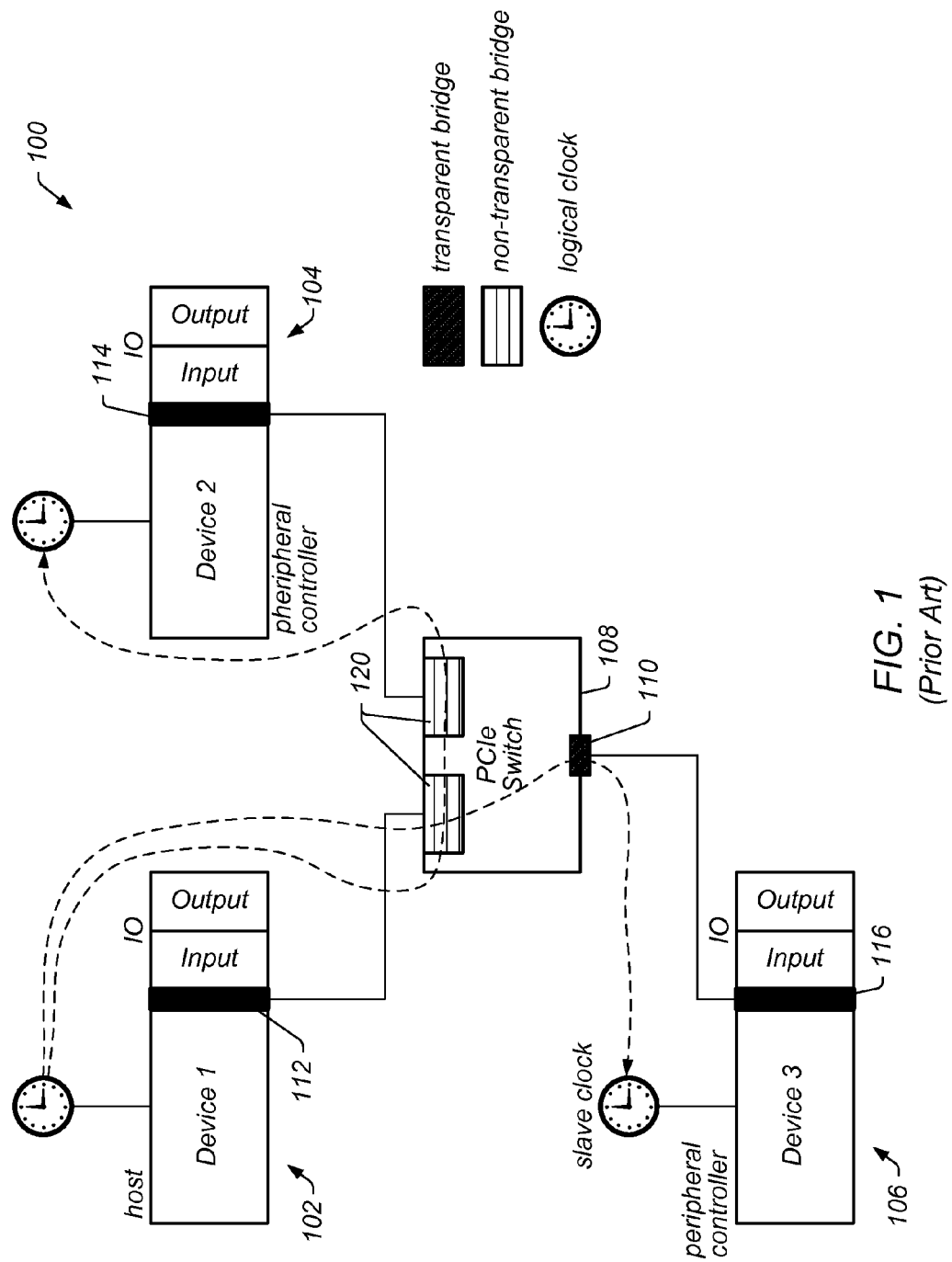
FIG. 1 illustrates a distributed system with multiple clock domains, according to the prior art.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117 titled "System and Method for Programmatically Generating a Graphical Program in Response to Program Information," filed Dec. 20, 2000.

TERMS

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Diagram—A graphical image displayed on a computer display which visually indicates relationships between graphical elements in the diagram. Diagrams may include configuration diagrams, system diagrams, physical diagrams, and/or graphical programs (among others). In some embodiments, diagrams may be executable to perform specified functionality, e.g., measurement or industrial operations, which is represented by the diagram. Executable diagrams may include graphical programs (described below) where icons connected by wires illustrate functionality of the graphical program. Alternatively, or additionally, the diagram may comprise a system diagram which may indicate functionality and/or connectivity implemented by one or more devices. Various graphical user interfaces (GUIs), e.g., front panels, may be associated with the diagram.

Graphical Program—A program comprising a plurality of interconnected nodes or icons, wherein the plurality of interconnected nodes or icons visually indicate functionality of the program. A graphical program is a type of diagram.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Data Flow Graphical Program (or Data Flow Diagram)—A graphical program or diagram comprising a plurality of interconnected nodes, wherein the connections between the nodes indicate that data produced by one node is used by another node.

Physical Diagram—A diagram which visually indicates physical connectivity between physical devices. For example, a physical diagram may visually indicate the connectivity of various physical components in a measurement system, e.g., a computer connected to a measurement device via an Ethernet network. Thus the wires in a physical diagram represent physical connectivity between devices. A physical diagram may show the corresponding "real world" physical system/devices.

Configuration Diagram—A diagram which indicates connectivity between real and/or virtual devices. A configuration diagram may visually indicate physical connectivity between physical devices as shown in a physical diagram. However, in some embodiments, one or more of the devices (or all of the devices) in the configuration diagram may be virtual or simulated devices. Thus, some or all of the devices in the configuration diagram may not be physically present in the system represented by the configuration diagram.

System Diagram—A diagram with one or more device icons and graphical program code, wherein the device icons are use to specify and/or visually indicate where different portions of graphical program code are deployed/executed. A system diagram may indicate where (i.e., on which system/device) programs or code may be executed. For example, the system diagram may include graphical indications showing where portions of the displayed graphical program code are executed. In some embodiments, various ones of the icons may represent processing elements which have associated programs for execution. At least one of the icons may represent logical elements (e.g., executable software functions or graphical program code). One or more of the device icons may represent configurable elements. Thus, the system diagram may provide a system view which allows a user to easily understand where graphical program code is deployed among the various devices in the system.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes (sub-VIs), terminal nodes, structure nodes, etc. Nodes may be connected together in a graphical program by connection icons or wires. The term "logical element" is used herein to refer to a "node". For example, the term "logical element: may refer to a software program portion or code that is executable by (or implementable on) a processing element, and which is represented iconically on a display. Logical elements include virtual instruments (VIs), primitives, etc. Logical elements may be displayed in various ones of the diagrams described herein, e.g., in graphical programs, system diagrams, etc.

Wire—a graphical element displayed in a diagram on a display that connects icons or nodes in the diagram. The diagram may be a graphical program (where the icons correspond to software functions), a system diagram (where the icons may correspond to hardware devices or software functions), etc. The wire is generally used to indicate, specify, or implement communication between the icons, or that express or specify a connection or relationship between the icons (or entities represented by the icons). Wires may represent logical data transfer between icons, or may represent a physical communication medium, such as Ethernet, USB, etc. Wires may implement and operate under various protocols, including data flow semantics, non-data flow semantics, etc. Some wires, e.g., buffered data transfer wires, may be configurable to implement or follow specified protocols or semantics. Wires may indicate communication of data, timing information, status information, control information, and/or other information between icons. In some embodiments, wires may have different visual appearances which may indicate different characteristics of the wire (e.g., type of data exchange semantics, data transport protocols, data transport mediums, and/or type of information passed between the icons, among others).

Data Flow Wire—a graphical element displayed in a diagram on a display that connects icons or nodes in the diagram and denoting that data is exchanged between the two icons or nodes.

Isochronous Data Flow Wire—a graphical element displayed in a diagram on a display that connects icons or nodes in the diagram, which denotes that data is exchanged between the two entities and that further denotes and constrains the exchange of data to occur periodically, at a fixed rate that remains constant over time. The data exchange path or transmission media (e.g., PCI bus) may be managed such that it is available to exchange the data at the appointed time, thus guaranteeing bandwidth for the transfer, and providing an upper bound for the data's arrival time (transfer latency).

Clock Disciplining Wire—a graphical element displayed in a diagram on a display that connects two clocks in a clock hierarchy, and that establishes a master/slave relationship between the two clocks.

Timed Invocation Wire—a graphical element displayed in a diagram on a display that connects two nodes or icons, where a first node or icon invokes (causes execution of) a second node or icon connected by the timed invocation wire to the first node or icon. The first node or icon determines the execution rate of the second node or icon by communicating the execution rate to the second node or icon via the timed invocation wire, or, alternatively, by sending invocation commands (or events) to the second node or icon via the timed invocation wire or by some other mechanism.

Timing Wire—a graphical element displayed in a diagram on a display that connects two entities (e.g., nodes or icons), and that implies a timing relationship between them. The timing relationship may be any of a master/slave clock disciplining relationship or an invocation timing relationship.

Invocation Timing Relationship—a relationship in which a first node or icon is connected to a second node or icon by a timed invocation wire where the execution rate of the second node or icon is controlled by the first node or icon.

Execution Rate—the number of invocations per unit time of an entity.

Execution Offset—a delay in the execution of one node or icon with respect to execution of another node or icon, where, e.g., a first node or icon is connected to a second node or icon by a timed invocation wire where the execution rate of the second node or icon is controlled by the first node or icon. The moment of execution of the second node or icon may be configured to be delayed (or offset) from the time strictly determined by the first node or icon.

Timing Generator—a node on a graphical diagram that is the source of timed invocation wires.

Timing Diagram—a graphical diagram depicting the master/slave relationships and invocation timing relationships of all the entities (e.g., nodes or icons) in a system.

Graphical User Interface—this term is intended to have the full breadth of its ordinary meaning The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a diagram, e.g., a graphical program. In this instance, various mechanisms may be used to connect GUI Elements in the GUI with nodes or icons in the diagram/graphical program. For example, when Input Controls and Output Indicators are created in the GUI, corresponding nodes (e.g., terminals) may be automatically created in the diagram or graphical program. Alternatively, the user can place terminal nodes in the diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program or diagram, and view output of the program or diagram, during execution.

A front panel is a type of GUI. A front panel may be associated with a diagram or graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Processing Element—A hardware component or device which is operable to execute software, implement code (e.g., program code), be configured according to a hardware description, etc. Processing elements include various processors and/or programmable hardware elements (e.g., field programmable gate arrays (FPGAs)), or systems that contain processors or programmable hardware elements, among others. For example, a processing element may refer to an individual processor in a computer system or the computer system itself.

Configurable Elements—Systems or devices that provide configurable functionality but do not themselves includes processors that process data. Configurable elements may produce and/or consume data that may be provided to or received from various processing elements. A configurable element may have or receive configuration data that specifies functionality of the configurable element. Configurable elements comprise data acquisition (DAQ) devices and/or other sensors/devices.

Clock—a periodic signal, e.g., as in a two valued (binary) electrical signal; an entity that can be queried for a time stamp.

Time stamp—a data representation of time; an indication of when a record was generated or acquired, e.g., in terms of a tick count of a clock, a single unit of time, e.g., seconds, a multi-unit instant in time, e.g., year:month:day:hours:minutes:seconds:sub-seconds.

Clock Hierarchy—a collection of two or more clocks that share in a synchronization scheme such that all the clocks in the hierarchy agree on the time, where one clock operates as master clock and the others operate as slaves. The synchronization scheme may insure that all the periodic binary electrical signals in the hierarchy have a fixed phase relationship, and that all clocks return equal valued time stamps when queried at the same instant.

Phase Relationship—the relative time between like changes in value of two or more binary electrical signals. The phase relationship is 'fixed' when the relative time of these like value changes between the signals is constant over the life of the signals.

Clock Symbol—a node on a graphical diagram that represents a clock.

Master Clock—a first clock in a clock hierarchy with which the remaining clocks in the hierarchy must agree.

Slave Clock—a second clock in a clock hierarchy whose timing is forced to agree with a first clock in the clock hierarchy where the first clock is called the master clock.

Master/Slave Relationship—a first clock in a clock hierarchy forces a second clock in the clock hierarchy to agree with the first clock, including maintaining a fixed phase relationship between first and second binary valued electrical signals, and time stamp equivalency for simultaneous first and second clock time stamp queries. The first clock is the master in this relationship between the two clocks, and the second clock is the slave in this relationship.

Embodiment of a system and method for clock distribution in a distributed system with multiple clock domains over a switched fabric are described below. It should be noted that while some of the embodiments disclosed herein are described in terms of devices with processors, e.g., controllers, coupled over a PCIe switched fabric, it should be noted that the techniques disclosed herein are broadly applicable to devices with or without processors or other functional units, coupled via a switched fabric (but not necessarily a PCIe switched fabric).

As used herein, the term "functional unit" refers to a processor and memory, a programmable hardware element, e.g., a field programmable gate array (FPGA), or a combination of both. Further, as used herein, the term "controller" refers to a computing device that couples to one or more other devices, e.g., peripheral devices, motion drives, actuators, etc., and which may be configured to communicate with, e.g., to control, such devices.

For example, in one embodiment the controllers may be embedded devices, e.g., in a distributed control system, e.g., a distributed motion control system. As used herein, the term "embedded device" refers to a small platform which includes dedicated hardware, and which includes a processor and memory (or FPGA) on which may be installed dedicated programs or software. An embedded device is typically designed to perform a defined task very well. In particular, an embedded device is typically not a device with general capabilities, such as a PC or PXI controller, for example, loaded with one or several plug-in boards, running a Microsoft OS with generous amounts of memory, system files, utilities, etc, that can be used as a measurement system, or as an office computer, or as a Web browser, etc. Thus, for example, an embedded controller may not include display capabilities typical of home computers or workstations. In some embodiments, the embedded controllers may be accessible, e.g., for monitoring or configuring, via a temporary interface, e.g., via connecting the controllers to a host computer which provides GUI functionality. Alternatively, in some embodiments, the controllers may be accessed via a web interface utilizing a web browser. Of course, any other means for interfacing with the controllers may be used as desired.

Figure 2A:
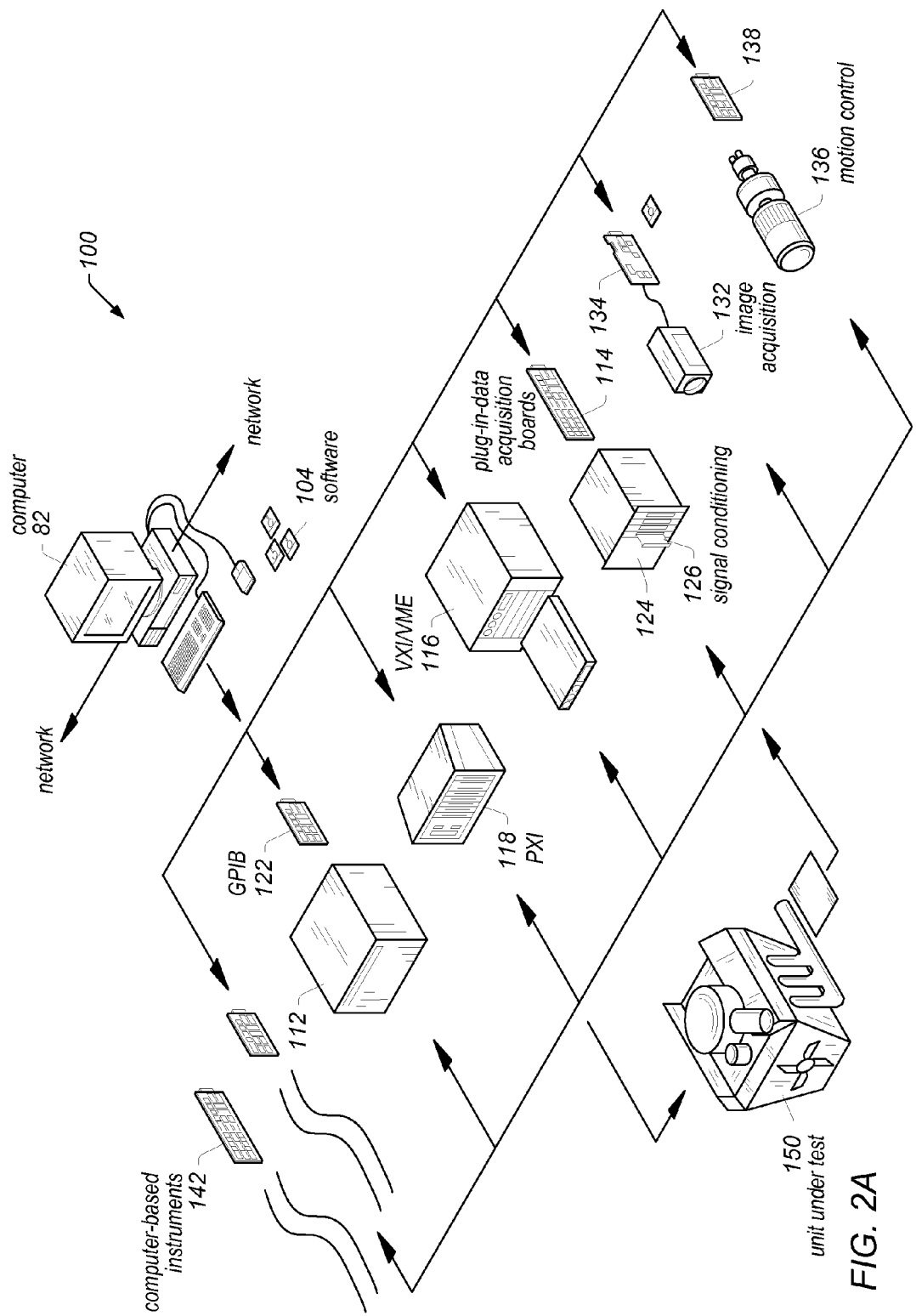
FIG. 2A illustrates an instrumentation control system according to one embodiment of the invention.
Figure 2B:
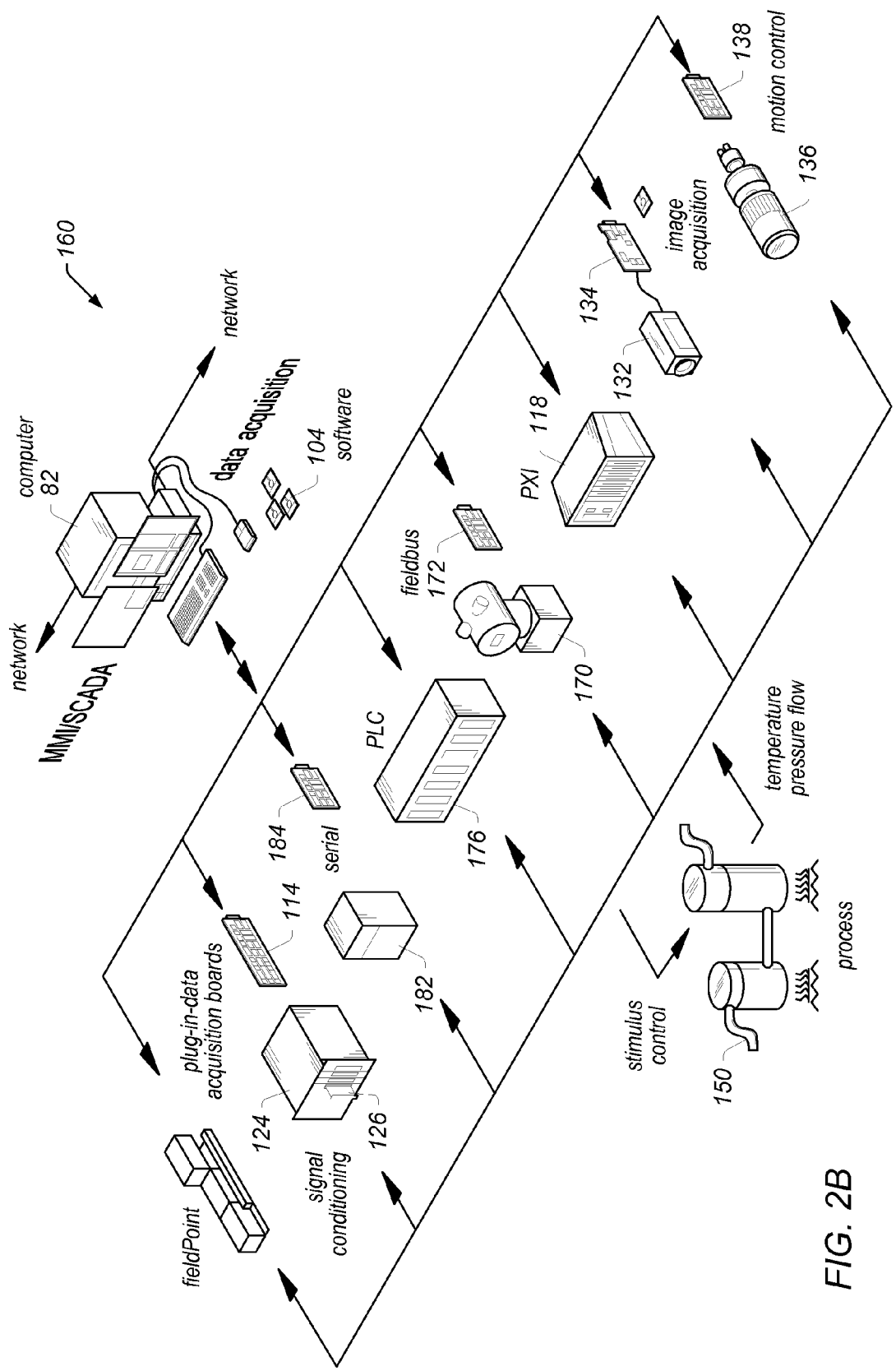
FIG. 2B illustrates an industrial automation system according to one embodiment of the invention.

In other embodiments, the industrial controllers may be or include personal computers or workstations, as illustrated in FIGS. 1, 2A, and 2B.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Additionally, the techniques disclosed herein may be further applicable in other domains, such as, for example, audio/video applications, timed data acquisition, radio frequency applications, etc., among others.

FIG. 2A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

Figure 4:
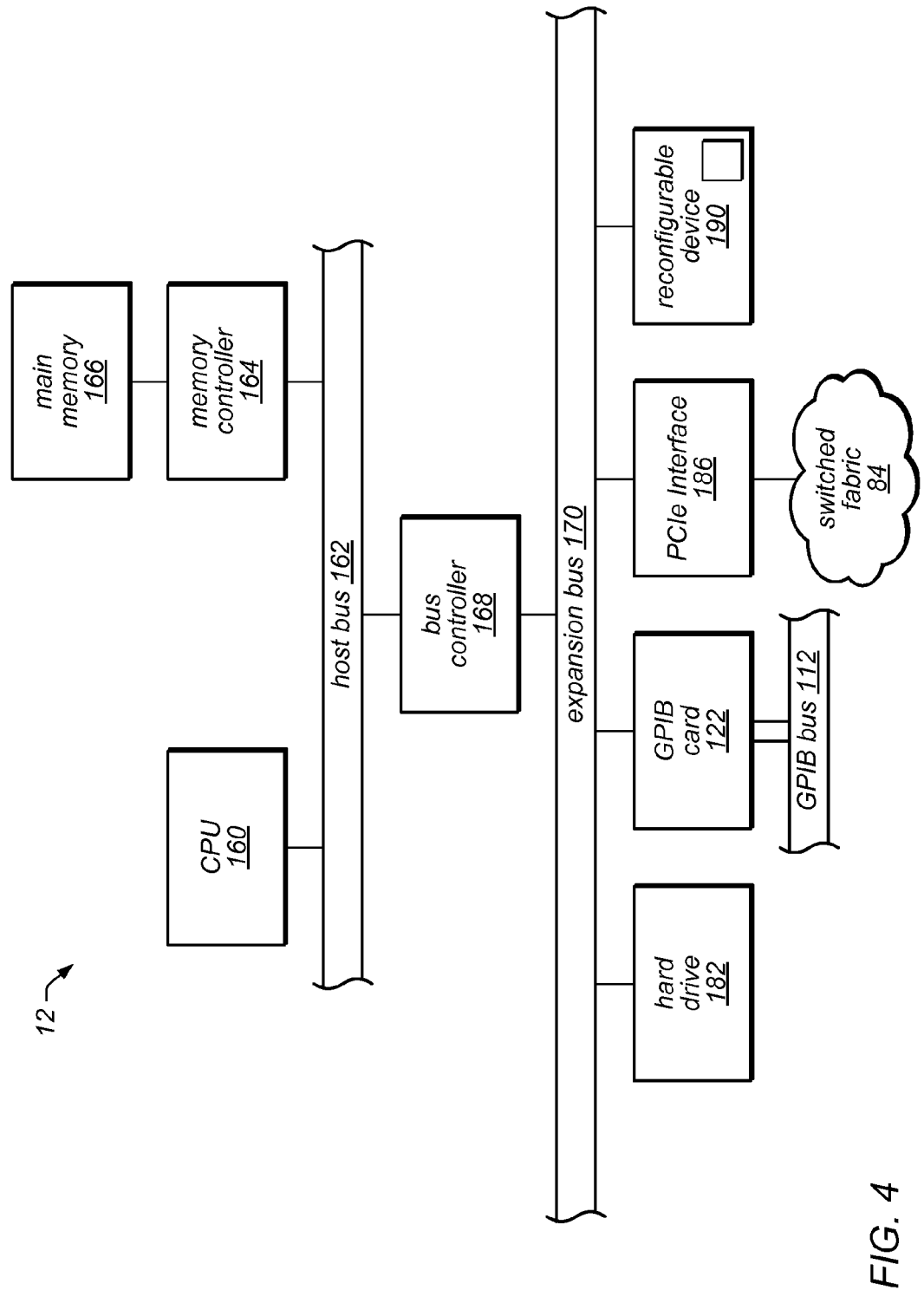
FIG. 4 is an exemplary block diagram of the computer systems of FIGS. 1, 2A, 2B, and 3B.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. In one embodiment, the computer 82 may couple to a switched fabric, e.g., a PCIe (Peripheral Component Interconnect (PCI) Express) based switched fabric, e.g., via a PCIe interface, as indicated in FIG. 4, and may couple to one or more instruments or other devices with respective (and different) clock domains, as discussed in more detail below.

The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which couples to one or more devices or instruments, possibly via a switched fabric, e.g., In one embodiment, the computer 82 may couple to a switched fabric, e.g., a PCIe based switched fabric, e.g., via a PCIe interface, as indicated in FIG. 4, and may couple to one or more instruments or other devices with respective (and different) clock domains. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 3A:
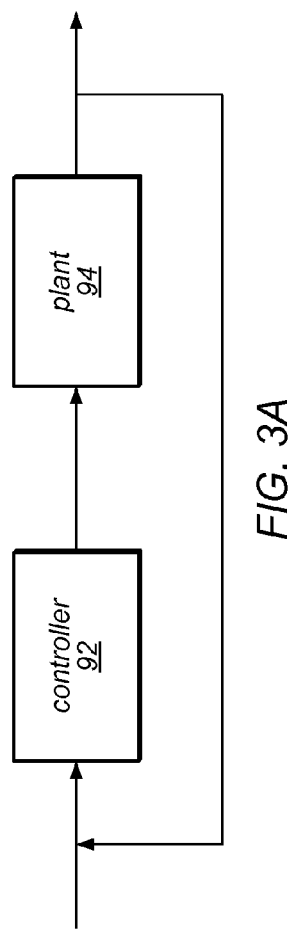
FIG. 3A is a high level block diagram of an exemplary system which may execute or utilize graphical programs.

FIG. 3A is a high level block diagram of an exemplary system which may execute or utilize programs according to some embodiments. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a program, e.g., a graphical program, which specifies or implements the functionality of one or both of the controller 92 and the plant 94. For example, a control engineer may use a modeling and simulation tool to create a model (e.g., program) of the plant 94 and/or to create the algorithm (program) for the controller 92.

Figure 3B:
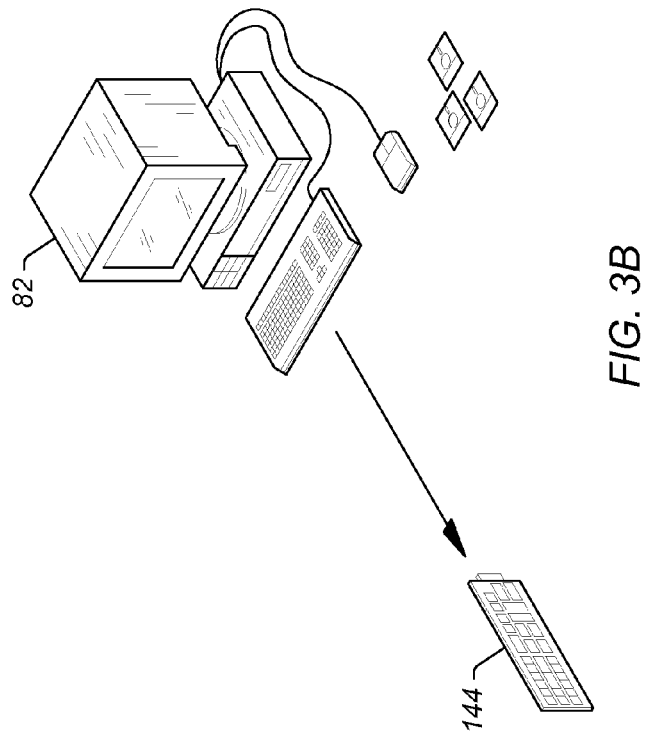
FIG. 3B illustrates an exemplary system which may perform control and/or simulation functions utilizing graphical programs.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a program. In a similar manner, the plant 94 may be implemented by a computer system or other device 144 (e.g., including a processor and memory medium and/or including a programmable hardware element) that executes or implements a program, or may be implemented in or as a real physical system, e.g., a car engine.

In one embodiment of the invention, one or more programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a program, e.g., a graphical program, and the program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a program. Thus the user may create a program on a computer and use (execute) the program on that computer or deploy the program to a target device (for remote execution on the target device) that is remotely located from the computer and coupled to the computer through a network. As noted above, in some embodiments, the program or programs implementing or implemented by the present invention may be graphical programs.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

FIG. 4—Computer System Block Diagram

FIG. 4 is a block diagram representing one embodiment of a computer system or controller, as shown in FIG. 1, 2A, or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, a controller, e.g., an embedded controller, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store the program(s) configured to implement embodiments of the invention. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or a PCIe (Peripheral Component Interconnect (PCI) Express) interface 186 for coupling to a switched fabric 84, e.g., a PCIe based switched fabric, although other switched fabrics and interfaces may be used as desired.

As shown, a device (or multiple devices, e.g., controllers) 190 may also be connected to the computer. The device 190 may include a processor and memory which may execute a real time operating system. The device 190 may also or instead comprise a programmable hardware element. The computer system may be configured to deploy a program to the device 190 for execution. The deployed program may take the form of graphical program instructions or data structures that directly represents the graphical program. Alternatively, the deployed program may take the form of text code (e.g., C code), which may be written, or generated from a graphical program. As another example, the deployed program may take the form of compiled code generated from either the graphical program or from text code, which may itself have been generated from the graphical program.

Synchronization Issues

As indicated above, synchronizing devices in a distributed system that includes or spans multiple clock (time) domains can be problematic. There are a number of possible sources of error regarding such synchronization, and thus, a corresponding number of adjustments that can be made to correct them.

Generally, synchronized distributed systems include one device, referred to as the master device, which is used to provide a reference clock, and one or more other devices, referred to as slave devices, slave to it, i.e. discipline their (logical) clocks to the reference. It should be noted that in applications where devices in such a distributed system time stamp data, e.g., as part of a data acquisition (DAQ) or data generation process, proper time stamping of data in accordance with the master clock by devices in different clock domains may also be considered "synchronization", although this is a slightly different meaning from the term's typical use in industrial or other commercial applications.

Note that as used herein the term "logical clock" refers to a software or hardware implantation of a clock that is derived from a physical clock, e.g., a local physical clock on a device, and which can be "disciplined" to, i.e., forced to match, the reference or master clock.

Three primary sources of timing errors are:

1. Propagation delay: Since distributed systems are connected using cables; there is delay that needs to be accounted for.

2. Offset: The local time of each slave clock may be offset from the reference clock.

3. Drift with respect to the reference clock: Due to quartz variation between the individual clocks a natural drift occurs in the clocks with respect to each other.

If a timing reference is determined for each device, the timing reference may be used to compensate for the differences in timing between the master clock and each device's clock. For example, the timing reference may be used to adjust actions or events, e.g., time stamping data, communications, etc., thereby compensating for the differences with the master clock. As another example, various adjustments may be determined and made to bring slave devices (more specifically, their logical clocks) into synchrony with the master device.

Figure 5:
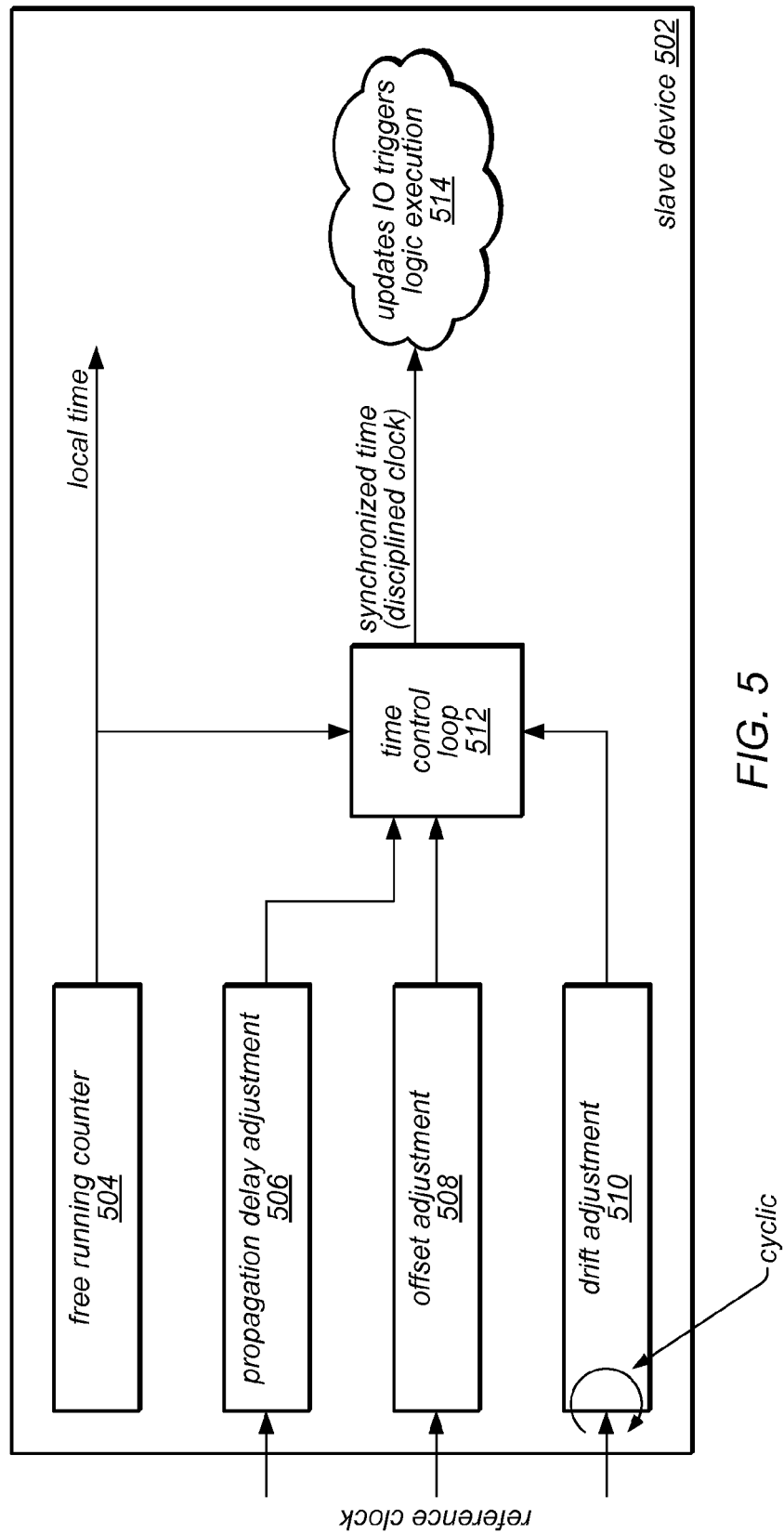
FIG. 5 illustrates exemplary timing adjustments in a distributed system, according to one embodiment.

FIG. 5 illustrates three such adjustments that may be made to a slave device's logical clock to set and maintain synchrony with a master clock, which may be referred to as a reference clock, or to otherwise compensate for time differences. As FIG. 5 shows, in one embodiment, a reference or master clock signal may be used to achieve one or more of the following:

1. Measure the propagation delay: The propagation delay may be determined or calculated from the reference clock to each slave clock individually, and added as a propagation delay adjustment 506 to the offset measurement (see below) between the two clocks. This value may be calculated once at start up time.

2. Offset Compensation: The local time of each slave clock may be compared to the reference clock, and this difference may be compensated for individually by determining an offset adjustment value 508, and writing the value to each slave device. This determination may also be part of a startup operation, and so may be performed one time to ensure that all devices are using the same absolute time.

3. Drift compensation with respect to the reference clock: The drift between the reference clock and each slave clock may be measured periodically and used to readjust the local clocks, e.g., to determine a drift adjustment 510, as shown. This periodicity of the drift adjustment determination is indicated in FIG. 5 by the cyclic indicator in the bottom left portion of the Figure.

As also shown, in some embodiments, the one or more determined adjustments may be implemented via a time control loop 512 (of the each slave device), where, for example, the time control loop may receive the adjustment(s), as well as a free running counter 504 of the slave device, e.g., a counter reflecting the device's local physical clock, as input, and may generate a disciplined clock (signal), i.e., an adjusted logical clock indicating synchronized time, which may then be used to update I/O, trigger logic execution 514, and so forth, operating in synchrony with the master clock. Alternatively, in some embodiments, the devices' logical clocks may not be adjusted (or even adjustable), in which case, the timing reference may be used to modify or implement event schedules or time-based operations without adjusting the logical clocks. For example, in a time stamping operation, the device may use the time reference to modify the value of the time stamp to be in accord with the master clock.

In some embodiments, the issues mentioned above may be addressed by adding counters to the system whereby each device can determine differences between its clock and a master clock of the system, as explained in detail below.

Latency and Counters

As noted above, the use of physical transmission media, e.g., cables, to transmit clock signals in a distributed system results in latencies which can introduce errors in synchronization. Note further that clocks, which are generally implemented by some form of oscillator, provide regular pulses for clocking, but do not generally indicate elapsed time. Thus, counters that increment with each clock pulse are often employed for reading or otherwise interfacing with the clock. Thus, reading a clock may actually mean reading a counter that operates based on the clock. If counters for different clocks are initially synchronized, then subsequent differences in the counter values may indicate clock divergence.

Now, depending on where the counters are located, these latencies may affect the accuracy, i.e., timeliness, of the value read from the clock. For example, if the counter is located far enough away from the clock, by the time the counter is read, the value is already somewhat "out of date", in that the clock keeps ticking while the clock signal is transmitted to (and counted by) the counter. Similarly, even if the counter is near enough to the clock to be considered to have no latency with respect to the clock, any other device reading the clock introduces latency due to the time it takes to read the counter, e.g., due to the distance from the other device to the counter.

Below are also presented various techniques for determining latencies and adjusting for these latencies using counters associated with clocks of devices in distributed systems.

Figure 6:
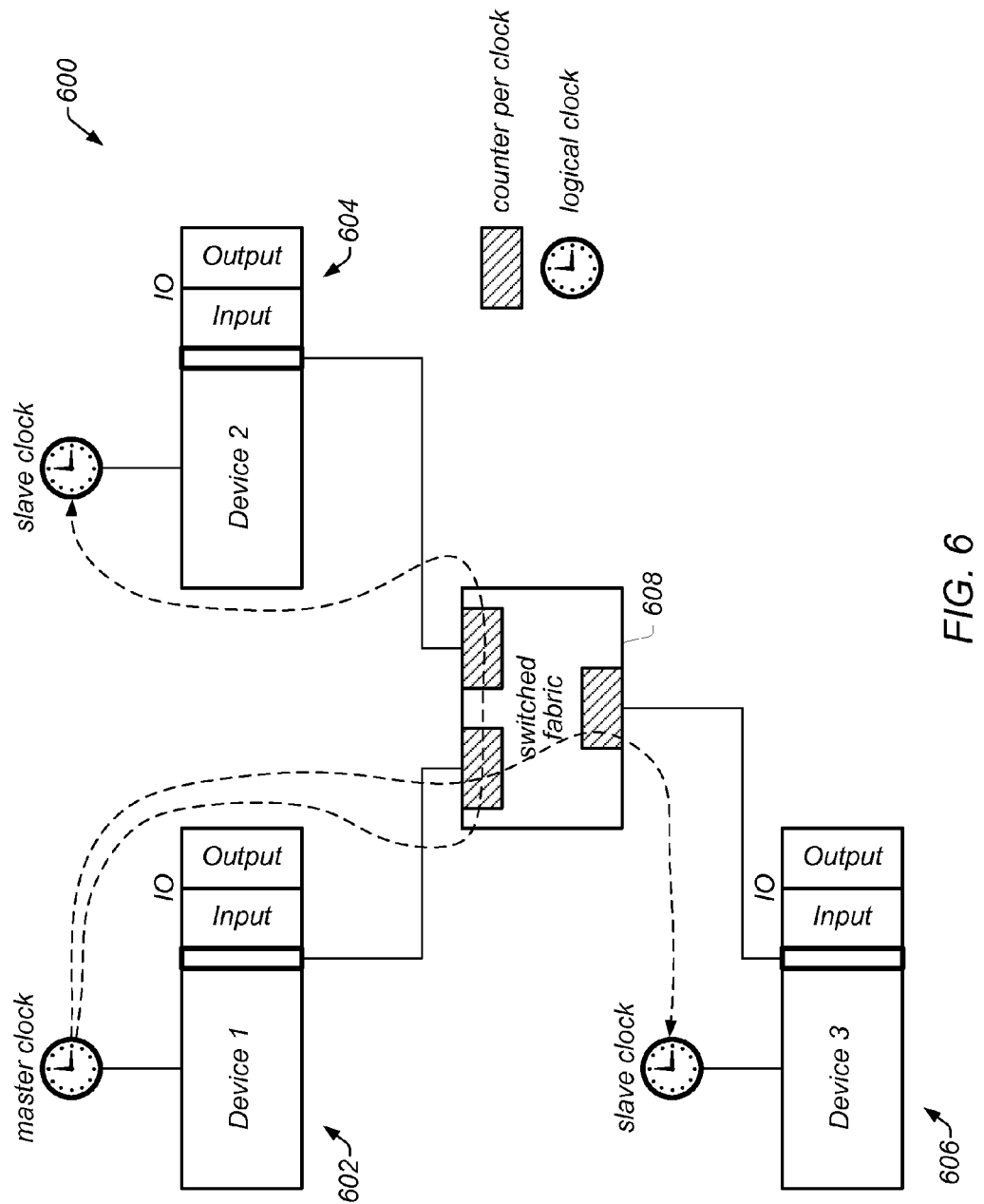
FIG. 6 is an exemplary block diagram illustrating clock disciplining in a distributed system with multiple clock domains, according to one embodiment.
Figure 7:
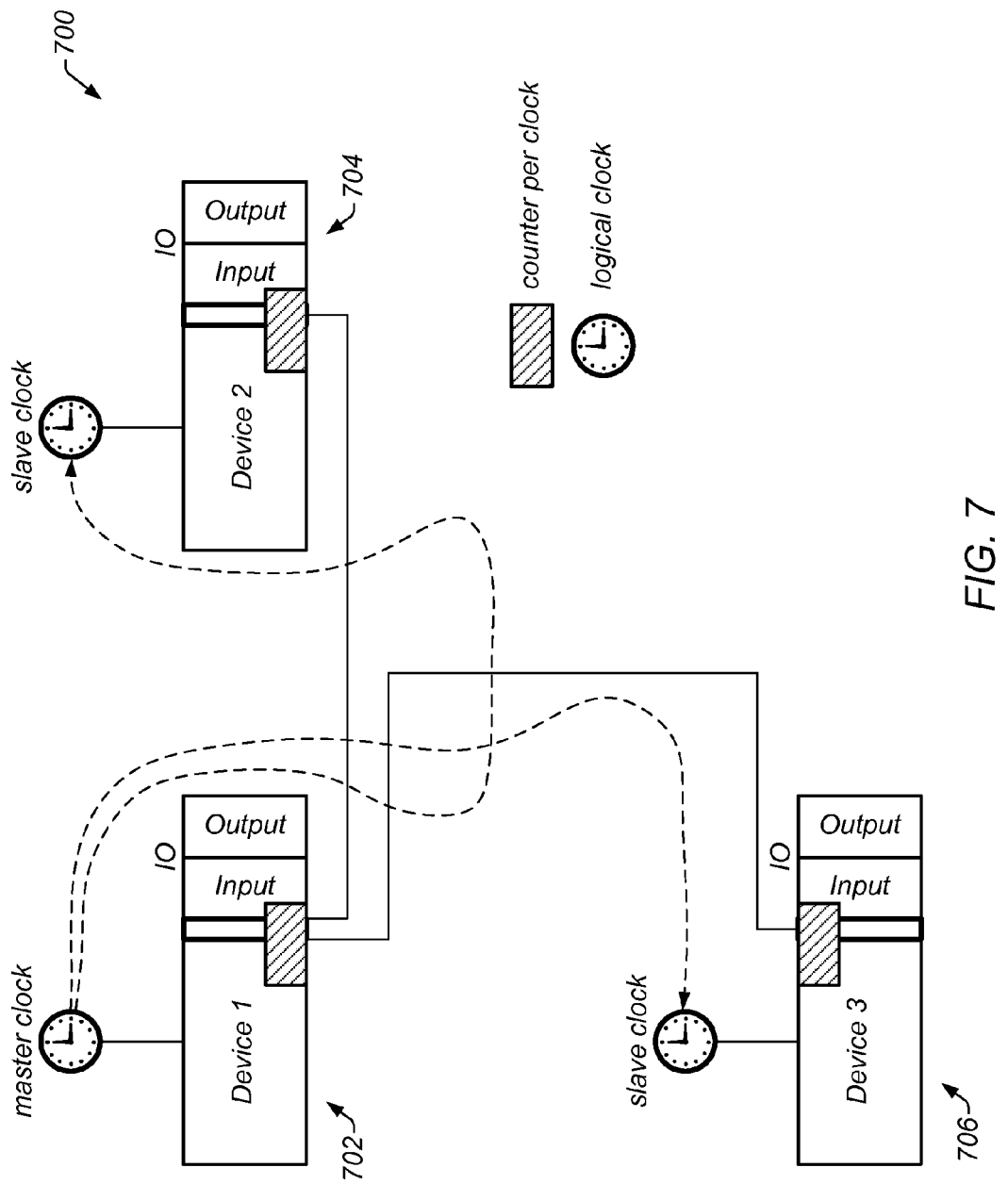
FIG. 7 is an exemplary block diagram illustrating clock disciplining in a distributed system with multiple clock domains, according to another embodiment.

FIGS. 6 and 7—Exemplary Distributed Systems

FIG. 6 is a simplified block diagram of an exemplary distributed system 600 in which a plurality of devices (in this simple case, three), specifically, device 1 602, device 2 604, and device 3 606, are coupled via a switched fabric 608, and where the switched fabric includes respective counters corresponding to the devices' clocks. More specifically, in the embodiment shown, a master device (device 1), i.e., a device with a master clock, provides a reference or master clock signal, which may be used by one or more slave devices to discipline their respective logical clocks, i.e., to synchronize their logical clocks to the reference or master clock. This disciplining of the slave devices' clocks, which may be referred to as "slave clocks", is indicated by dashed lines from the master clock to each of the slave clocks.

As indicated in FIG. 6, in one embodiment, the minimum requirements to implement the techniques disclosed herein is one counter per clock, where each counter is accessible by all devices connected via a switched fabric, e.g., to allow devices to read the counters, determine differences in the counter values, and determine time references based on the differences. The time reference may then be used in a variety of ways to operate the device in accordance with the master clock, e.g., allowing a device to calculate drift, and adjust the time control loops to synchronize themselves to the master clock. Thus, for example, in the embodiment of FIG. 6, where the master clock is device 1, then device 2 may calculate the drift as follows:

Drift correction=(counter value of device 1)−(counter value of device 2).

Note that this drift correction if computed periodically may be used (e.g., by device 2) to speed up or slow down the clock on device 2.

FIG. 7 is a simplified block diagram of an exemplary distributed system 700 in which, like that of FIG. 6, a master device 702 is coupled to two slave devices 704, possibly via a switched fabric (not shown), but where the respective counters corresponding to the devices' clocks are in or on the devices themselves, rather than a switch (or switch fabric), as shown.

It should be noted that the embodiments of FIGS. 6 and 7 are meant to be exemplary only, and are not intended to limit the systems contemplated to any particular number or type of devices. For example, in various embodiments, some of the counters may be located on respective devices and others on a switch of the fabric, or there may be different numbers (and types) of slave devices. Moreover, as discussed below, in some embodiments, the master clock (signal) may be provided by an external device.

Figure 8:
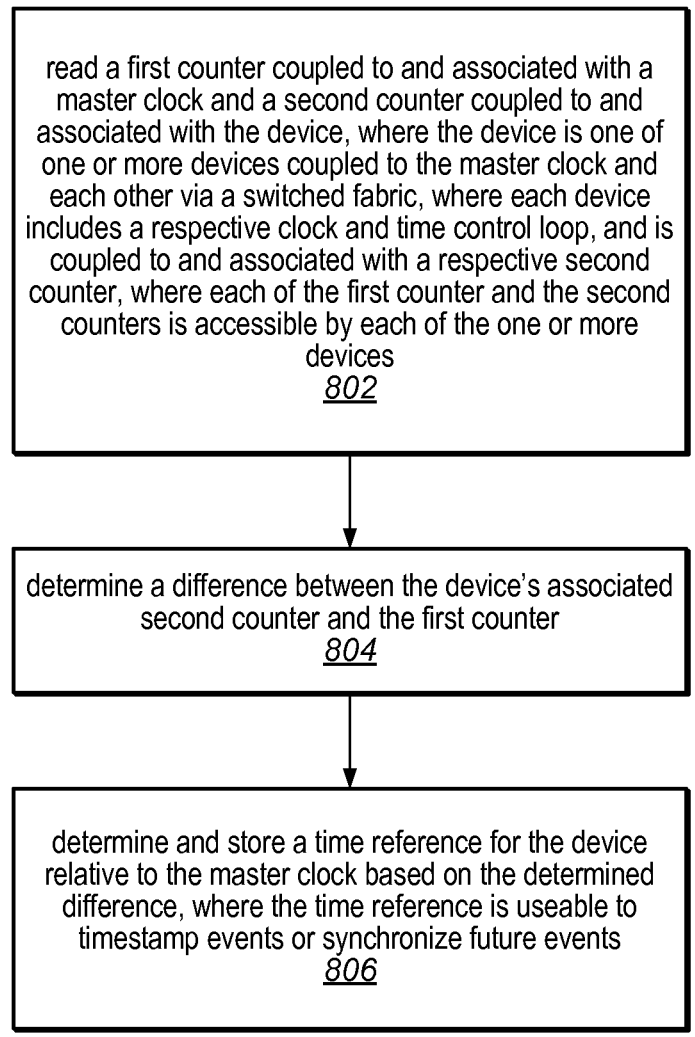
FIG. 8 is a flowchart diagram illustrating one embodiment of a method for clock distribution in a distributed system with multiple clock domains over a switched fabric.

FIG. 8—Flowchart of a Method for Clock Distribution in a Distributed System with Multiple Clock Domains Over a Switched Fabric FIG. 8 illustrates a method for clock distribution in a distributed system with multiple clock domains over a switched fabric, according to one embodiment. The method shown in FIG. 8 may be used in conjunction with any of the computer systems or devices shown in the above Figures, among other devices. In preferred embodiments, the method may be performed in or by a distributed system that includes a master clock, a first counter coupled to and associated with the master clock (e.g., a master counter), one or more devices coupled to the master clock and each other via a switched fabric, where each device includes a respective (physical and/or logical) clock and time control loop, and one or more second counters. Each second counter may be coupled to and associated with a respective one of the one or more devices, and each second counter may be accessible by each of the one or more devices.

In various embodiments, some of the method elements shown may be performed concurrently, in a different order than shown, or may be omitted. Additional method elements may also be performed as desired. As shown, this method may operate as follows.

First, in 802, a device may read a first counter coupled to and associated with a master clock, as well as a second counter coupled to and associated with the device. For example, the device may be one of one or more devices coupled to the master clock and each other via a switched fabric, e.g., a PCIe switched fabric. The coupled devices and switched fabric may thus form a distributed system. In one embodiment, the one or more devices may be slave devices. As noted above, in one embodiment, each device may include a respective clock and a second counter. Thus, each second counter may be coupled to and associated with a respective one of the one or more devices. Moreover, each of the first counter and the second counters may be accessible by each of the one or more devices. In other words, any of the one or more devices may read any of the counters.

In 804, a difference between the device's associated second counter and the first counter may be determined, e.g., by the device. Thus, for example, if the value of the first counter is V1, and the value of the device's associated second counter is V2, the device may compute (V1−V2), or, alternatively, (V2−V1), depending on sign convention. This difference may thus indicate the error or difference between the master clock and that of the device.

In 806, a time reference for the device relative to the master clock may be determined and stored based on the determined difference. The time reference may then be useable to time stamp events or synchronize future events. In other words, the time reference may be used by the device to operate in synchrony with the master clock, or to time stamp data in accordance with the master clock, or used by some other device, e.g., a master device, to perform some function, e.g., a communication or control function. More generally, the time reference allows the device(s) to operate or to be operated in a manner where timing differences between the device's clock and the master clock are compensated for.

In some embodiments, one or more of the devices may include a functional unit. For example, in one embodiment, the master clock may be included in a host device with a functional unit. The host device may send a multicast reset signal over the switched fabric to synchronize the first and second counters on startup. The method may thus include the device receiving a multicast reset signal from the host device over the switched fabric to synchronize the first and second counters on startup, and synchronizing the device's associated second counter with the first counter based on the reset signal on startup. In this way, each of the devices may start operations with synchronized counters, thus improving the accuracy and effectiveness of the techniques disclosed herein.

As noted above, the time reference may be used in any of a variety of ways to compensate for timing differences between the devices and the master clock. For example, in one embodiment, a drift adjustment value for the device may be determined based on the time reference, which indicates or represents the determined difference. For example, depending on sign convention and the manner in which the difference is computed, e.g., (V1−V2) vs (V2−V1), if the counter value difference of 804 indicates that the device's clock is behind the master clock, the adjustment may be positive, e.g., to compensate for the lag. In other words, the (absolute) adjustment value may be added to the device's (logical) clock. Conversely, if the counter value difference of 804 indicates that the device's clock is ahead of the master clock, the adjustment may be negative, e.g., to compensate for the lead. As noted above, the adjustment may be applied to the device's logical clock, or may be used to adjust the timing of particular actions or events, e.g., time stamping, communications, etc. Thus, in one embodiment, the device's logical clock may be adjusted via the device's time control loop to synchronize the device to the master clock based on the drift adjustment value.

In some embodiments, each of the one or more devices may have an associated propagation delay corresponding to a signal path between the device's clock and the master clock. Thus, to increase the accuracy of the above-determined drift adjustment or correction, it may be useful to include the propagation delay between (or even within) the devices in determining the timing reference (and possibly a corresponding timing adjustment) for each slave device. Note that the placement of the counters may affect the latencies (e.g., propagation delays between the various clocks and counters) of the system, and thus, the adjustments or corrections needed to ameliorate these latencies.

As indicated above, propagation delay is the amount of time it takes the head of the signal to travel from sender to receiver over a medium. Thus, in the embodiments of FIGS. 6 and 7, when device 2 reads the counter connected to the master clock, it may need to take the amount of time it takes the value to reach the (master clock) counter from device 1 and subtract it from the total. Conversely the device may also need to add the time it takes to read the counter connected to its own clock.

Thus, in one embodiment, the method may further include (the device) determining the device's associated propagation delay. The time reference may then be determined further based on the propagation delay. Similarly, in embodiments where the device's logical clock is adjusted, adjusting the device's logical clock via the device's time control loop may include adjusting the device's logical clock further based on the determined associated propagation delay.

In some embodiments, this value may be provided using heuristics or calculated using a standard formula for the type of medium used to transmit the clock signals. For example, in one embodiment, estimates of distance, e.g., signal path length, and signal speed (wave or signal propagation speed) may be used to estimate propagation delay, e.g., distance/speed, where the estimated distance from clock or device to counter divided by the estimated signal speed results in an estimate of propagation delay. Note that in wireless communications the signal speed is speed of light, which may be considered to be effectively instantaneous, e.g., with no substantial latency. However, in copper wires the speed is typically about 67% the speed of light. By taking into account propagation delays, the value of drift compensation may be more precisely adjusted to achieve higher precision in clock synchronization.

Figure 9:
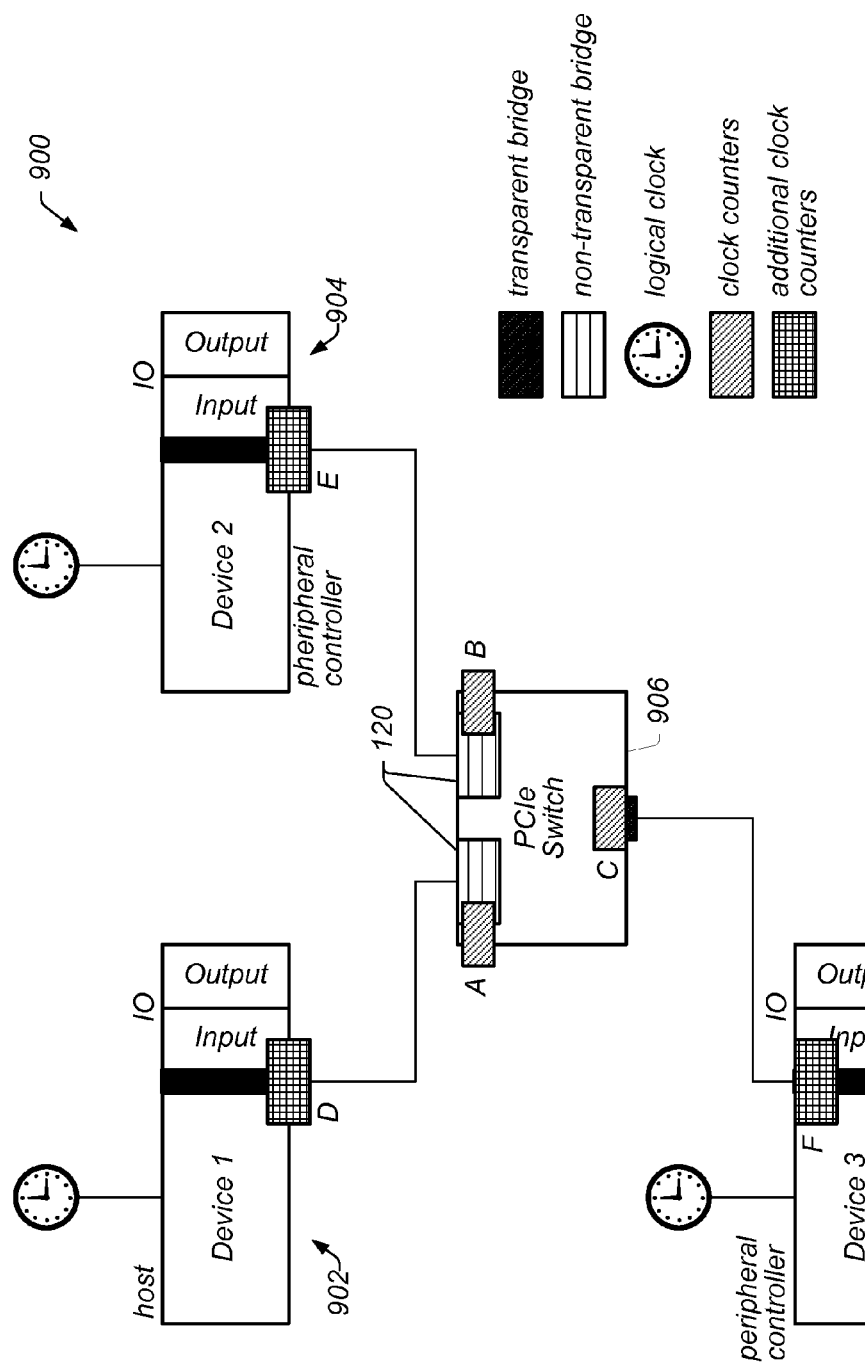
FIG. 9 is an exemplary block diagram illustrating a distributed system with multiple clock domains coupled via a PCIe based switched fabric with an external master clock source, according to one embodiment.

One methodology of dynamically calculating the propagation delay using additional counters is illustrated in FIG. 9. As may be seen, in this embodiment, counters A, B, and C (corresponding respectively to device 1 902, device 2 904, and device 3 906) may be located on a switch 908 of the switched fabric coupling the devices. In the embodiment shown, the switch 908 is a PCIe switch with non-transparent bridges between respective clock domains. Thus, while not necessary for all embodiments of the invention, the embodiment of FIG. 9 utilizes a PCIe switch and non-transparent bridge (NTB) technology to implement embodiments of the techniques described herein.

More specifically, in this embodiment, a clock counter has been added per port to the switch. This counter may count the reference clock (e.g., REFCLK) of the bus (e.g., PCI-Express) it is connected to. The switch may allow atomic latching reads on all its counters. Moreover, in one embodiment, the counters may have the ability to be reset by any port, as well as the capability of being targeted by a multicast operation for global reset, as noted above, which may allow starting the counting (or counters) synchronously.

As also shown, in the embodiment of FIG. 9, additional counters may be added to the system for better resolution, e.g., for clock synchronization, although it should be noted that these additional counters are not required for some embodiments of the invention to work. For example, as may be seen in FIG. 9, in some embodiments, a counter may be added to each of the transparent bridges in the system, e.g., to each transparent bridge of the devices, for better resolution in calculating the propagation delay. More specifically, FIG. 9 shows the counters described above using the example topology of FIG. 1, where each transparent bridge has a respective counter. Note that the embodiment of FIG. 9 is simply an implementation example that provides a better level of precision/accuracy than approaches that do not utilize such additional counters. However, it should be noted that an important feature of the techniques disclosed herein is that there should be at least one counter per clock domain in the system. In further embodiments, additional counters may be added elsewhere so long as they satisfy the at least one counter per clock domain rule.

Thus, by adding these additional counters, each device can reliably compute propagation delay values for each signal path between respective counter pairs, which may then be used to more accurately determine the device's time reference. Said another way, by placing counters at the boundaries of clock domains, where the counters are accessible by all the devices, each device can determine relevant propagation delays (by comparing counter values as described above), and can thus modify its time reference accordingly.

For example, in one illustrative embodiment directed to the system of FIG. 9, e.g., where the system includes three devices (and three clock domains), with counters A, B, and C, on the switch, and counters D, E, and F, on the respective devices, the propagation delays may be computed thusely:

Device 1 may read the counters $D(V_D)$ and $A(V_A)$ by issuing consecutive reads. Since counters D and A are counting the same clock (device 1's physical clock); propagation delay between device 1 and the switch $PD1=V_A-V_D$.

Device 2 may read the counters $E(V_E)$ and $B(V_B)$ by issuing consecutive reads. Since counters B and E are counting the same clock (device 2's physical clock), propagation delay between device 2 and the switch $PD2=V_B-V_E$.

Device 3 may read the counters $F(V_F)$ and $C(V_C)$ by issuing consecutive reads. Since counters F and C are counting the same clock (device 3's physical clock), propagation delay between device 3 and the switch $PD3=V_C-V_F$.

Alternately, if the additional registers are not implemented, the above propagation delays can be obtained heuristically, as noted above.

Device 2 and device 3 can read the current value of the clock from device 1. Since in this embodiment, device 1 (the host device) is assumed to be the reference, it does not have to determine a time reference or make any time adjustments, i.e., does not have to implement a time control loop. In contrast, device 2 and device 3 may determine respective time references with respect to device 1.

For example, device 2 and device 3 may discipline their logical clocks to device 1's clock. Using device 1's current time as reference, the offset adjustment can be obtained, thus, making the logical clocks on both device 2 and device 3 be the same as device 1.

For drift compensation, device 2 may periodically read the counters B and A and use the difference to determine or update its time reference. As noted above, in some embodiments, the time reference (or counter difference) may also be used to adjust the device's logical clock to compensate for drift. For example, in one embodiment, a time control loop on device 2 may periodically read the counters B and A and use the difference to slow down or speed up its logical disciplined clock. A similar time control loop on device 3 may periodically read counters C and A and use the difference to adjust its logical clock. As discussed above, the propagation delay may also be taken into account while calculating the time reference (and/or drift adjustment value):

$$t_{correction}(\text{for device 2})=(V_A-PD1)-(V_B-PD2)$$

If $t_{correction}$ is positive, the local time is running faster than the reference time (device 1's clock) and should be adjusted backward, e.g., slowed down. If $t_{correction}$ is negative, the local time is running slower than the reference time and should be adjusted forward, e.g., sped up. For example, in some embodiments, a time control loop on each device may adjust the speed of the device's logical clock and thereby discipline it to the master clock. Alternatively, as discussed above, in some embodiments, the time reference for each device may be used to adjust the timing of events, communications, etc., without modifying or disciplining a logical clock, e.g., by modifying a schedule, or dynamically adjusting the time of occurrence.

Thus, generalizing the above, in some embodiments, the switched fabric may include a switch that itself includes the one or more second counters, and each of the one or more devices may further include a respective third counter which is accessible by each of the other one or more devices. Determining the associated propagation delay may include determining a difference between the device's associated second counter and the device's third counter, and determining the propagation delay based on the determined difference between the device's associated second counter and the device's third counter. Further, determining and storing a time reference for the device relative to the master clock based on the determined difference may include determining a difference between the first counter and a propagation delay of the master clock, thereby generating a first delay value, determining a difference between the device's second counter and the device's propagation delay, thereby generating a second delay value, and determining a difference between the first delay value and the second delay value, thereby determining the time reference for the device (which may be used as desired, e.g., to adjust the device's logical clock, etc.).

Note that in the above example, it is assumed that all clocks being counted are running at similar frequencies. If this assumption is not valid, the value of the counter may need to be divided by the frequency before using the results. In other words, the counters may need to be adjusted to have the correct (and same) time basis.

Figure 10:
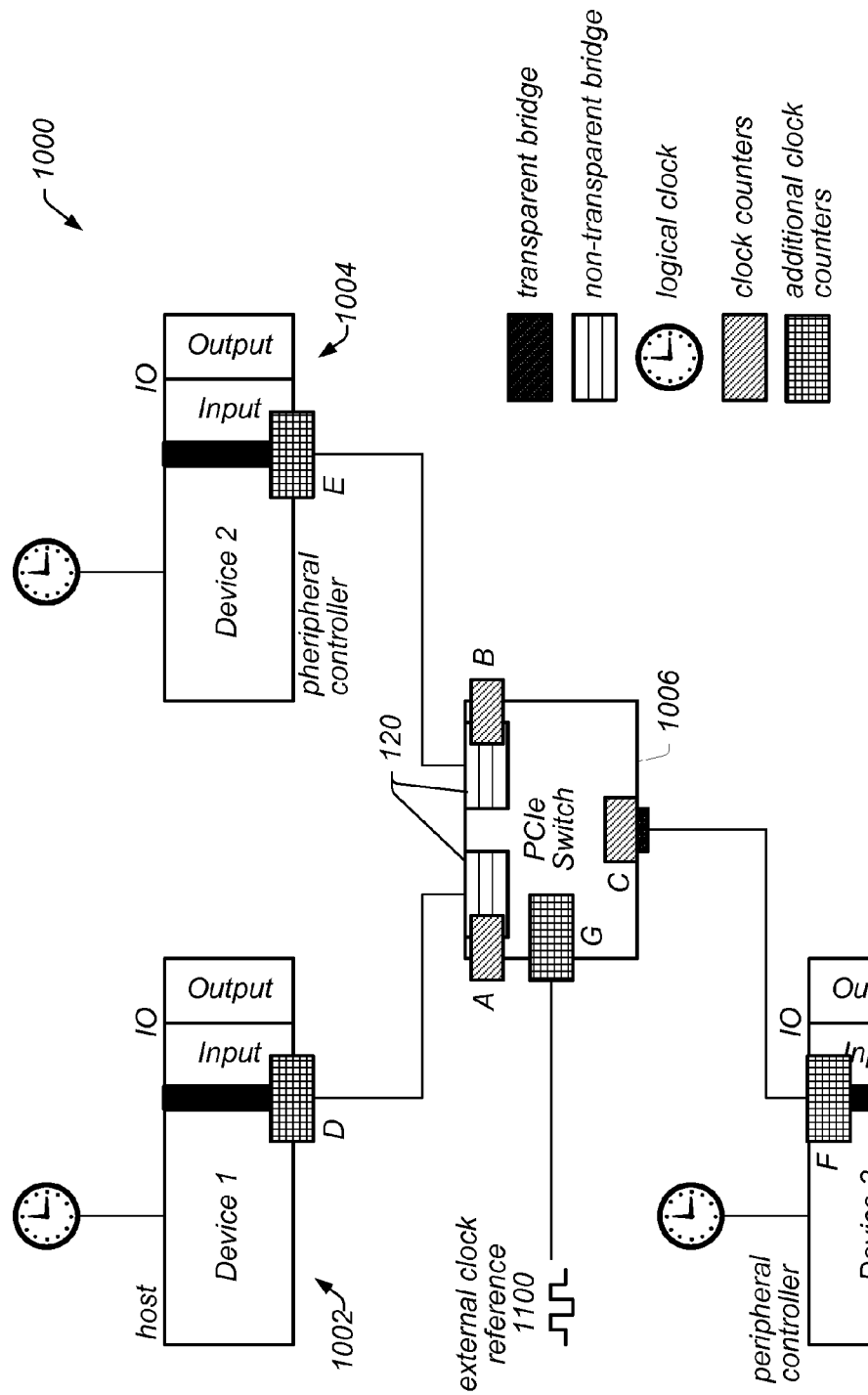
FIG. 10 is an exemplary block diagram illustrating a distributed system with multiple clock domains coupled via a PCIe based switched fabric, according to one embodiment.

In another embodiment, the master clock may be external, e.g., may not be located in or on one of the devices. FIG. 10 illustrates such an embodiment, where, as may be seen, an external clock reference (e.g., an external master clock reference) 1100 is provided to the switch (in this embodiment, a PCIe switch). In other words, none of the devices is considered a master device, clock-wise. Using an external reference changes the techniques disclosed above only slightly, and may allow disparate clock domains to be synchronized using a common reference, as well as allowing usage of a higher resolution/cleaner clock as reference.

As FIG. 10 indicates, in embodiments that use an external master clock (reference), an additional counter may be added to the switch that can be driven by the externally connected clock, thus allowing the user to choose an external reference clock instead relying on one of the controllers (devices) connected to the switch.

For example, for determining the time reference or drift compensation, rather than using counter A as a reference counter, counter G (see FIG. 10) may be used instead. Additionally device 1 may also need to implement a time control loop to adjust for drift, since it is no longer the master device. Note that in this embodiment, an offset adjustment may need to be provided explicitly to all devices (e.g., controllers) with respect to the reference clock if disparate domains need to be synchronized; otherwise, any one device's time may be chosen as the reference, in which case, the chosen device may set its offset adjustment to zero.

Thus, various embodiments of the above described systems and methods may utilize counters to determine time references for devices coupled via a switched fabric whereby the devices may operate in accordance with a master clock. It should be noted that the embodiments described herein are meant to be exemplary only, and that the various techniques and counter placements disclosed may be used in different combinations as desired.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A system, comprising:
   a master clock;
   a first counter, coupled to and associated with the master clock;
   one or more devices coupled to the master clock and each other via a switched fabric, wherein each of the one or more devices includes a respective clock;
   one or more second counters, wherein each second counter is coupled to and associated with a respective one of the one or more devices, and wherein each of the first counter and second counters is accessible by each of the one or more devices;
   wherein each of the one or more devices is configured to:
      read the first counter and the device's associated second counter;
      determine a difference between the first counter and the device's associated second counter, wherein the difference indicates a timing difference between the device and the master clock;
      determine and store a time reference for the device relative to the master clock based on the determined difference, wherein the time reference is useable to timestamp events or synchronize future events;
   wherein each of the one or more devices has an associated propagation delay corresponding to a signal path between the device's associated clock and the master clock, wherein each of the one or more devices is further configured to determine its associated propagation delay;
   wherein to determine and store a time reference for the device, each of the one or more devices is further configured to determine and store the time reference for the device further based on the determined associated propagation delay;
   wherein the switched fabric comprises a switch, wherein the switch comprises the one or more second counters, wherein each of the one or more devices further comprises a respective third counter which is accessible by each of the other one or more devices, and wherein to determine the associated propagation delay, each of the one or more devices is configured to:
      determine a difference between the device's associated second counter and the device's third counter; and
      determine the propagation delay based on the determined difference between the device's associated second counter and the device's third counter;
   wherein to determine and store a time reference for the device, each of the one or more devices is configured to:
      determine a difference between the first counter and a propagation delay of the master clock, thereby generating a first delay value;
      determine a difference between the device's second counter and the device's propagation delay, thereby generating a second delay value; and
      determine a difference between the first delay value and the second delay value, thereby determining the time reference for the device.

2. The system of claim 1, wherein the master clock is comprised in a host device, wherein the host device comprises a functional unit.

3. The system of claim 2,
   wherein the host device is configured to:
      send a multicast reset signal over the switched fabric to synchronize the first and second counters on startup; and
   wherein each of the one or more devices is configured to:
      synchronize the device's associated second counter with the first counter based on the reset signal on startup.

4. The system of claim 1, wherein to determine its associated propagation delay, each of the one or more devices is configured to:
   determine the associated propagation delay via a heuristic.

5. The system of claim 4, wherein to determine its associated propagation delay via a heuristic, each of the one or more devices is configured to:
   determine the associated propagation delay based on estimates of signal path length and signal propagation velocity.

6. The system of claim 1, wherein each of the one or more devices further comprises a time control loop and a logical clock driven by the device's clock, and wherein each of the one or more devices is further configured to:
   determine a drift adjustment value for the device based on the determined difference; and
   adjust the device's logical clock via the device's time control loop to synchronize the device to the master clock based on the drift adjustment value.

7. The system of claim 1, wherein each of the one or more second counters is comprised in its respective associated device.

8. The system of claim 1, wherein the switched fabric comprises a switch, wherein the master clock is an external clock that is independent from the devices, and wherein the first counter is comprised in the switch.

9. A method for synchronizing devices, the method comprising:
   a device performing:
      reading a first counter coupled to and associated with a master clock and a second counter coupled to and associated with the device, wherein the device is one of one or more devices coupled to the master clock and each other via a switched fabric, wherein each device includes a respective clock, and is coupled to and associated with a respective second counter, wherein each of the first counter and the second counters is accessible by each of the one or more devices;
      determining a difference between the device's associated second counter and the first counter;
      determining and storing a time reference for the device relative to the master clock based on the determined difference, wherein the time reference is useable to timestamp events or synchronize future events;
   wherein each of the one or more devices has an associated propagation delay corresponding to a signal path between the device's clock and the master clock, the method further comprising:
the device performing:
determining the device's associated propagation delay;
wherein said determining and storing a time reference for the device relative to the master clock based on the determined difference comprises:
determining and storing a time reference for the device further based on the determined associated propagation delay;
wherein the switched fabric comprises a switch, wherein the switch comprises the one or more second counters, wherein each of the one or more devices further comprises a respective third counter which is accessible by each of the other one or more devices, and wherein said determining the associated propagation delay comprises:
determining a difference between the device's associated second counter and the device's third counter; and
determining the propagation delay based on the determined difference between the device's associated second counter and the device's third counter;
wherein said determining and storing a time reference for the device relative to the master clock based on the determined difference comprises:
determining a difference between the first counter and a propagation delay of the master clock, thereby generating a first delay value;
determining a difference between the device's second counter and the device's propagation delay, thereby generating a second delay value; and
determining a difference between the first delay value and the second delay value, thereby determining the time reference for the device.

10. The method of claim 9, wherein the master clock is comprised in a host device, wherein the host device comprises a functional unit.

11. The method of claim 10, further comprising:
the device performing:
receiving a multicast reset signal from the host device over the switched fabric to synchronize the first and second counters on startup; and
synchronizing the device's associated second counter with the first counter based on the reset signal on startup.

12. The method of claim 9, wherein said determining the device's associated propagation delay comprises:
determining the associated propagation delay via a heuristic.

13. The method of claim 12, wherein said determining the device's associated propagation delay via a heuristic comprises:
determining the associated propagation delay based on estimates of signal path length and signal propagation speed.

14. The method of claim 9, wherein each of the one or more devices further comprises a time control loop and a logical clock driven by the device's clock, the method further comprising:
the device performing:
determining a drift adjustment value for the device based on the determined difference; and
adjusting the device's logical clock via the device's time control loop to synchronize the device to the master clock based on the drift adjustment value.

15. The method of claim 9, wherein each of the one or more second counters is comprised in its respective associated device.

16. The method of claim 9, wherein the switched fabric comprises a switch, wherein the master clock is an external clock that is independent from the devices, and wherein the first counter is comprised in the switch.

* * * * *